J. D. TRACY.
HORSE HAY-RAKES.

No. 194,483. Patented Aug. 21, 1877.

Witnesses:
P. C. Dieterich
Frank H. Duffy

Inventor:
John D. Tracy
per C. H. Watson & Co., Attorneys.

UNITED STATES PATENT OFFICE.

JOHN D. TRACY, OF STERLING, ILLINOIS.

IMPROVEMENT IN HORSE HAY-RAKES.

Specification forming part of Letters Patent No. 194,483, dated August 21, 1877; application filed March 9, 1877.

*To all whom it may concern:*

Be it known that I, JOHN D. TRACY, of Sterling, in the county of Whitesides and State of Illinois, have invented certain new and useful Improvements in Hay-Rake; and I do hereby declare that the following is a full, clear, and exact description thereof, which will enable others skilled in the art to which it appertains to make and use the same, reference being had to the accompanying drawings, and to the letters of reference m rd thereon, which form a part of this specification.

This invention relates to revolving horse-rakes; and consists in the construction and arrangement of the tripping device and handle-arms and rake-head, by which the draft is applied and kept at the lowest possible point, for the purpose of giving the operator easy control and manipulation of the machine, as will be hereinafter more fully described.

Figure 1:
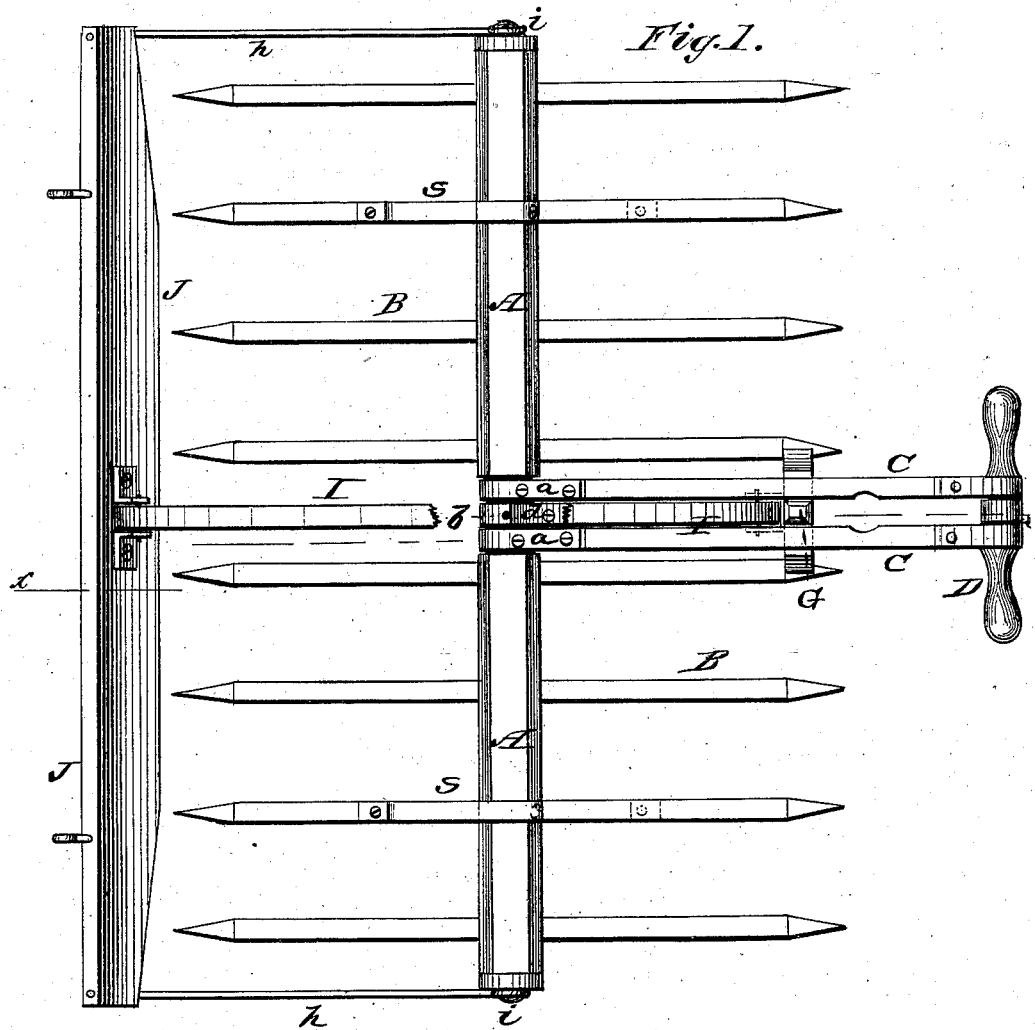
Figure 2:
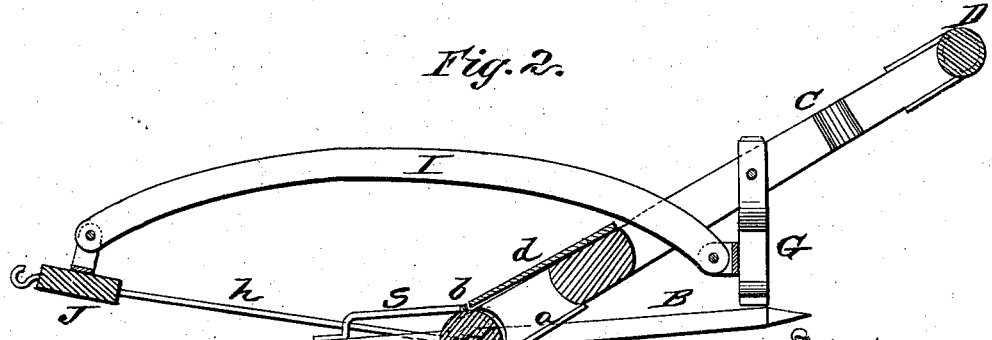

In the annexed drawing, which fully illustrates my invention, Figure 1 is a plan view of a hay-rake embodying my invention; and Fig. 2 is a section of the same on line $x\ x$, Fig. 1.

A represents the rake-head, provided with teeth B B, projecting in opposite directions from the same. The rake-head is held to two parallel connected arms, C C, by means of the straps $a\ a$, in which the rake revolves, said arms being at their outer ends provided with the handle D.

On the rake-head, between the strap or boxes $a\ a$, on opposite sides, are two lugs, $b\ b$, forming stops against a spring, $d$, attached to the arms, for preventing the rake from rotating backward.

G represents the usual trip, pivoted between the arms C C, and resting on the two center teeth at the rear of the rake. This trip is, by a pivoted or hinged bar, I, connected with the center of the draft-bar J, said bar I passing forward between the parallel arms C C. From each end of the draft-bar J extends a rod, $h$, the rear end of which is provided with or bent to form an eye, and connected by a pin or screw, $i$, to the center of the end of the rake-head, said pins or screws turning in the eyes with the rake.

In the operation of the rake the trip G is thrown out by merely raising the handles of the rake to a certain height. The draw-bar J, being carried proportionately high to the rake-head by the draft of the horse, pushes back the trip from the teeth and allows the rake to revolve. Then, by lowering the hands or handles it catches on the next teeth, and is then ready to gather more hay.

S S represent shoes attached to opposite sides of the rake, and on opposite sides of the rake-head, for the rake to ride on over the ground.

By this construction the draft is brought to the lowest possible point, and there is less leverage between the draw-bar and the points of the teeth, so that the rake is less liable to revolve by means of the teeth catching or meeting obstructions when drawn over the ground, as the points of the teeth are but slightly out of the line of draft, thus rendering the work of the operator less laborious, and the bar I, being curved, allows it to be pivoted to the draw-bar, and at the same time allows sufficient space between it and the teeth for the hay to collect.

Having thus fully described the invention, what is claimed as new, and desired to be secured by Letters Patent, is—

The construction and arrangement, as herein shown and described, of the tripping device and handle, draw-bar and arms, and the curved bar and rake-head, by which the draft is applied and kept at the lowest possible point, for the purpose of giving the operator an easy control of the machine, as specified.

In testimony that I claim the foregoing as my own I affix my signature in presence of two witnesses.

JOHN D. TRACY.

Witnesses:
 SAMUEL WILSON,
 JOHN W. PLATT.